United States Patent [19]

Dubbe

[11] Patent Number: 4,483,550

[45] Date of Patent: Nov. 20, 1984

[54] TRAILER HITCH PIN

[76] Inventor: Ronald F. Dubbe, 356 - 3½ St., Waconia, Minn. 55387

[21] Appl. No.: 517,630

[22] Filed: Jul. 27, 1983

[51] Int. Cl.³ .............................................. B60D 1/02
[52] U.S. Cl. ..................................... 280/515; 411/351
[58] Field of Search ................ 280/515; 411/351, 500; 403/DIG. 1; 24/303; 248/206.5

[56] References Cited

U.S. PATENT DOCUMENTS

| | | | | |
|---|---|---|---|---|
| 2,360,928 | 10/1944 | Beechlyn | | 175/367 |
| 2,627,423 | 2/1953 | Copeman | | 280/515 |
| 2,660,444 | 11/1953 | Cade et al. | | 280/515 |
| 3,401,587 | 9/1968 | Kalls | | 411/355 |
| 3,429,586 | 2/1969 | Force | | 280/515 |
| 4,298,212 | 11/1981 | Jamison | | 280/515 |

Primary Examiner—John A. Pekar
Attorney, Agent, or Firm—Orrin M. Haugen; Thomas J. Nikolai; Douglas L. Tschida

[57] ABSTRACT

A hitch pin for securing a towed vehicle to a towing vehicle comprising an elongated pin member having first and second ends and a radially extending collar formed therebetween and a bail member attached to the pin proximate one end thereof. A toroidal case containing a magnet and having a magnetically permeable material as a base is disposed about the pin between the collar and the bail. A compression-type helical spring surrounds the pin intermediate the case and the bail for normally urging the magnet case against the collar but allowing the case to be displaced against the force of the spring.

8 Claims, 2 Drawing Figures

TRAILER HITCH PIN

BACKGROUND OF THE INVENTION

I. Field of the Invention

This invention relates generally to an apparatus for releasably securing a towed vehicle to a towing vehicle, and more specifically to a hitch pin arrangement adapted to pass through aligned apertures in two spaced-apart portions of a trailer hitch for coupling the end of the tongue of the towed vehicle to the towing vehicle.

II. Discussion of the Prior Art

Various forms of hitch pins are known in the art. In one common arrangement, the pin merely comprises an elongated cylindrical member having a handle at one end thereof, with the size of the handle being larger than the aperture in the trailer hitch with which the hitch pin is to be used. Formed proximate the opposite end of the pin is a transversely extending bore, which is adapted to receive a cotter key or the like to prevent the hitch pin from being inadvertently or accidentally removed from the trailer hitch due to bouncing, vibration or the like while passing over rough terrain. While effective for its intended purpose of joining a towed vehicle to a towing vehicle, this prior art type of hitch pin is less than satisfactory from the standpoint of ease of use. It tends to be a cumbersome operation to dismount from the towing vehicle, insert the hitch pin in the trailer hitch of that vehicle, and insert the cotter key through the bore in the hitch pin in order to couple the two vehicles together. Similarly, when it is desired to detach or decouple the two vehicles again, the operator is required to deal with the cotter key safety device.

Because of the inconvenience, some persons forego the use of the safety cotter key pin and thus risk loss of the hitch pin should it bounce free of the trailer hitch and also risk an inadvertent uncoupling of the towed vehicle from the towing vehicle.

The Copeman U.S. Pat. No. 2,627,423 describes a hitch pin in which a magnetic member is joined to the pin and the magnetic force of attraction is used to hold the hitch pin in position on the trailer hitch even when traversing rough ground. However, the design described in the Copeman patent was not altogether successful principally because magnets of the 1953 era did not have sufficient strength to hold tightly against the ferrous metal comprising the trailer hitch. Somewhat more recently, ceramic magnets having very high forces of attraction have become available. However, these ceramic magnets tend to be somewhat fragile and are easily shattered. Hence, if used as the magnetic member on the hitch pin of the Copeman patent, it would not stand up to the abusive treatment encountered during use. The hitch pin of the present invention provides a solution to that problem.

SUMMARY OF THE INVENTION

In accordance with the present invention, a hitch pin may incorporate a ceramic magnetic element to provide the desired strong attractive forces needed to hold it in position in a trailer hitch while the vehicle in question is subjected to bouncing and the like. Specifically, the hitch pin of the present invention comprises an elongated cylindrical pin having a wire bail as a handle at the head end thereof, and displaced a predetermined distance down from this bail along the shaft of the pin is a radially extending collar. Encircling the portion of the pin between the bail and this collar is a toroidal case having a magnetically permeable base and a rugged steel top for containing a toroidal ceramic magnet. A helical spring disposed about the pin between the bail and the collar normally urges the case or container against the shoulder defined by the radial collar; but when the case is subjected to substantial forces during use, it is able to yield against the force of the spring, thus rendering it less subject to deformation or destruction due to high impacts or the like.

OBJECTS

It is accordingly a principal object of the present invention to provide a new and improved hitch pin for use in coupling a towed and a towing vehicle.

Another object of the invention is to provide a hitch pin which remains held in position in a trailer hitch through the use of magnetic forces.

A still further object of the invention is to provide a hitch pin in which magnetic forces are used to hold the pin in a desired orientation and where the magnet is protected from destruction due to high applied impact forces during use.

These and other objects of the invention will become apparent to those skilled in the art from the following detailed description of the preferred embodiment, especially when considered in conjunction with the accompanying drawings.

DESCRIPTION OF THE PREFERRED EMBODIMENT

Figure 1:
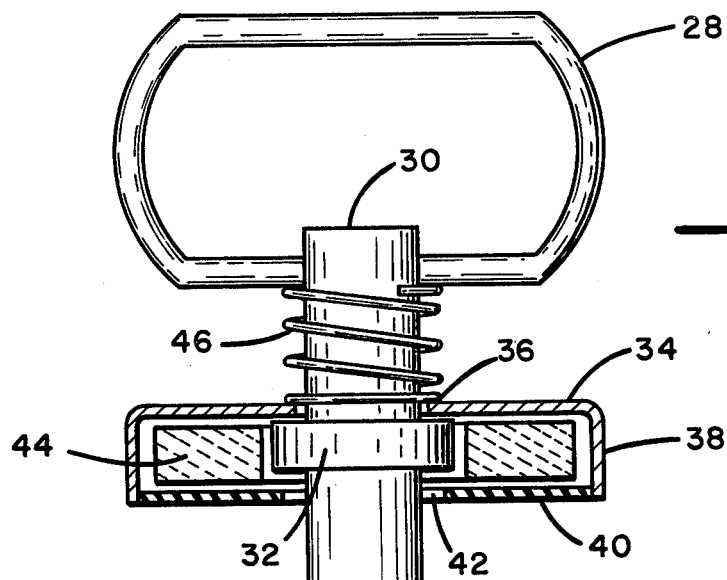
FIG. 1 illustrates a front view of the preferred embodiment with a portion thereof broken away to reveal otherwise internal hidden parts.
Figure 2:
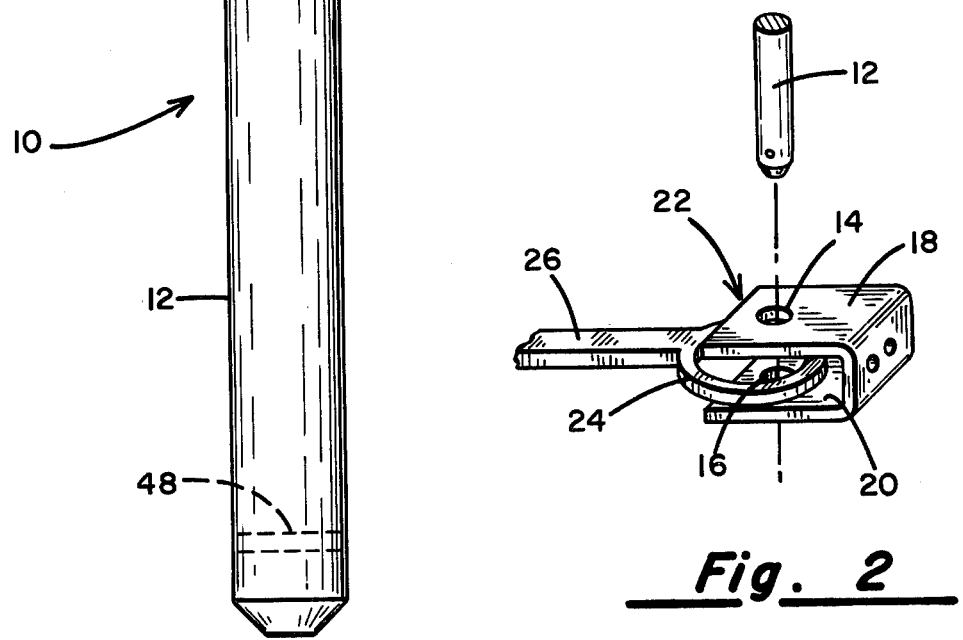
FIG. 2 is a perspective drawing showing the manner in which the hitch pin of the present invention is used in conjunction with a trailer hitch.

Referring to both FIGS. 1 and 2, the hitch pin of the present invention is indicated generally by the numeral 10 and is seen to comprise a cylindrical steel rod 12 of a predetermined length and diameter. Specifically, the shank length is such that it passes fully between the aligned apertures 14 and 16 formed in the upper leg 18 and lower leg 20 of the trailer hitch 22, which is adapted to be attached to the lower rear portion of the towing vehicle (not shown). The spacing between the legs 18 and 20 is such that it can receive a steel ring 24 secured to the end of the tongue 26 of the towed vehicle.

As seen in FIG. 1, the hitch pin of the present invention further comprises a handle member 28 in the form of a wire bail forming a generally closed loop with the ends of the wire bail being fitted within a bore formed diametrically through the head end 30 of the hitch pin 12.

Displaced below the head end 30 of the hitch pin 12 is a steel collar 32 which may either be integrally formed on the shaft of the pin 12 or may comprise a ring which is welded or otherwise affixed to the cylindrical shank 12. Surrounding the radially extending ring-like projection 32 is a steel case or container 34 which is circular in its plan view and which has a central opening 36 extending through it, the opening having a diameter larger than the diameter of the pin 12 but smaller than the diameter of the ring-like projection 32. The case 34 has a down-turned peripheral side wall 38 which is closed at its bottom end by a bottom plate 40 formed from a magnetically permeable material. The bottom plate 40 also has a central aperture 42 which has a diameter that is slightly greater than the diameter of the pin 12. Disposed within the container defined by the cover member 34 and the bottom plate 40 is a permanent magnet, preferably a toroidal ceramic magnet 44. The magnet 44 possesses a very strong magnetic field such that it tends to adhere with considerable force to a ferrous metal member such as the surface of the leg 18 of the trailer hitch member 22 in FIG. 2.

To maximize the force of attraction, the magnetic flux linking the trailer hitch should be maximized. To do this, an air gap in the range of from 0.062 to 0.090 inch is provided between the o.d. of the magnet and the i.d. of the case portion 38. Similarly, the bottom edge of the case 34 is made to extend below the bottom surface of the magnet to define a gap in the range of from 0.030 to 0.060 inch between the bottom of the magnet and the surface to which it is to adhere.

A helical compression spring 46 is arranged to surround the portion of the hitch pin shaft 12 between the wire bail or handle 28 and the upper surface of the steel cover member 34. As such, the spring normally urges the cover 34 and the permanent magnet 44 contained therein downward against the shoulder defined by the ring-like projection 32.

Formed proximate the lower end of the hinge pin 12 is a bore 48 through which a suitable security pin may be passed if desired.

In use, then, the operator may grip the handle 28 and holding the hitch pin by that handle may insert the cylindrical steel shaft 12 through the openings 14 and 16 formed in the trailer hitch. The hitch pin will drop down until the bottom plate 40 rests against the upper surface of the hitch leg 18. Because of the attractive force exerted by the toroidal ceramic magnet 44, the hitch pin will tend to firmly hold in position, even when subjected to substantial impacts, vibration and the like. The somewhat fragile ceramic magnet 44 is protected by virtue of being enclosed within the steel case 34. Furthermore, because the steel case 34 is free to rotate and to float up and down against the force exerted by the compression spring 46, the case and its contents tend to absorb shock forces and the like which might otherwise shatter the ceramic magnet.

The invention has been described herein in considerable detail in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A hitch pin for coupling a towed vehicle to a towing vehicle comprising in combination:
    (a) a steel shank of a predetermined length and cross-sectional size sufficient to pass completely through aligned apertures in a trailer hitch;
    (b) a toroidal case member disposed about said shank proximate an upper end thereof, said case being free to move a limited distance axially along said shank; and
    (c) a ring-shaped magnet contained within said case and surrounding said shank.
2. The hitch pin as in claim 1 and further including a radially extending projection disposed on said shank for limiting axial movement of said case with respect to said shank.
3. The hitch pin as in claim 2 wherein said radially extending projection comprises an annular collar.
4. The hitch pin as in claim 2 and further including:
    (a) handle means secured to said shank proximate the upper end thereof; and
    (b) biasing means disposed between said handle means and said case member for normally urging said case member against said collar.
5. The hitch pin as in claim 1 wherein said case member has a magnetically permeable bottom member.
6. The hitch pin as in claim 4 wherein said biasing means comprises a helical compression spring surrounding a portion of said shank.
7. The hitch pin as in claim 1 wherein a gap in the range of from 0.062 to 0.090 inch exists between the outside diameter of said magnet and the inside diameter of said case member.
8. The hitch pin as in claim 5 wherein said magnetically permeable bottom member has a thickness in the range of from 0.030 to 0.060 inch.

* * * * *